July 18, 1950  E. E. DAVIS  2,515,295
COMBINED CLUTCH AND BRAKE MECHANISM
Filed Feb. 10, 1948  2 Sheets-Sheet 1
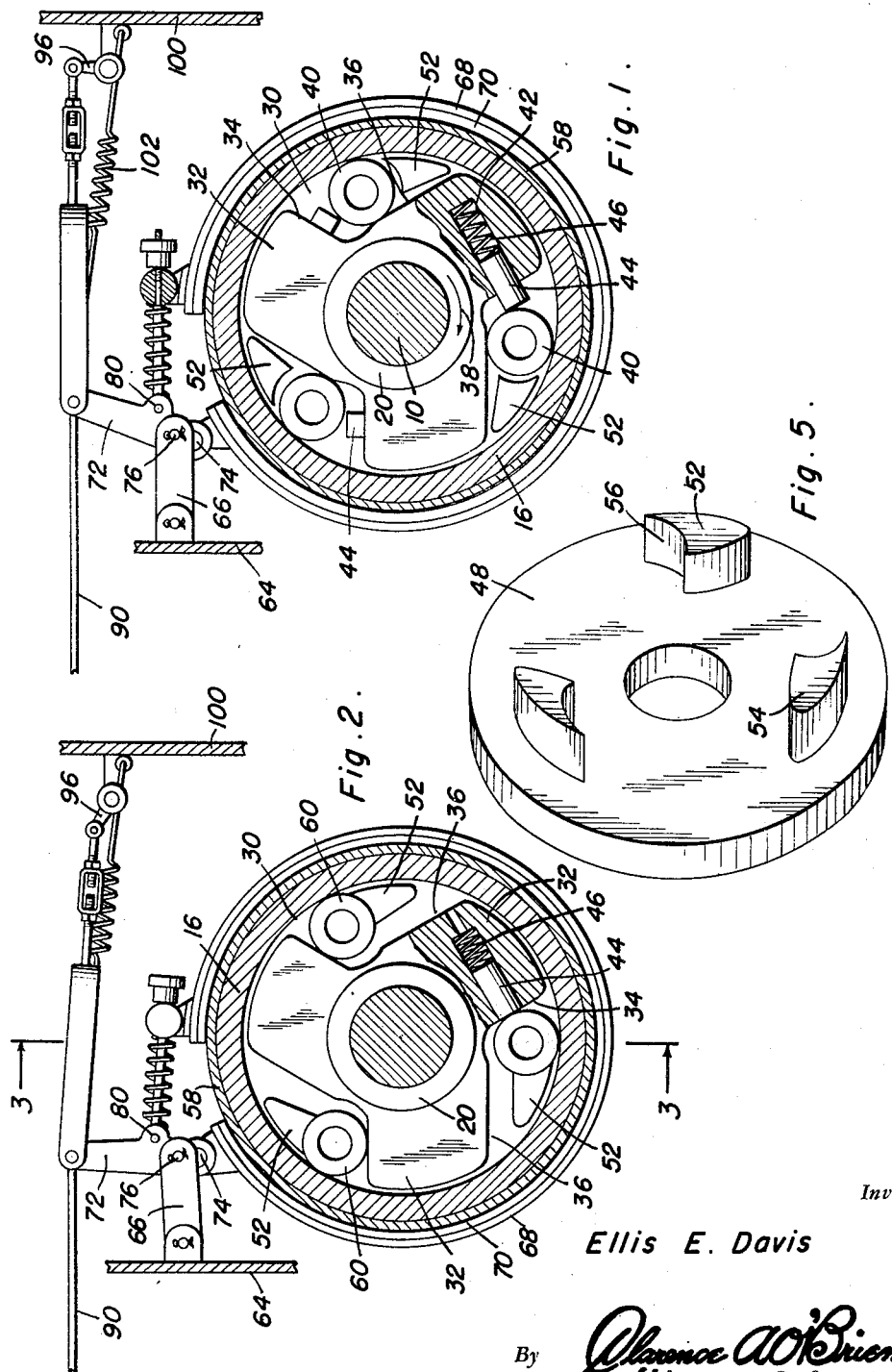
Inventor
Ellis E. Davis
By Clarence A. O'Brien
and Harvey B. Jacobson
Attorneys July 18, 1950 E. E. DAVIS 2,515,295
COMBINED CLUTCH AND BRAKE MECHANISM
Filed Feb. 10, 1948 2 Sheets-Sheet 2
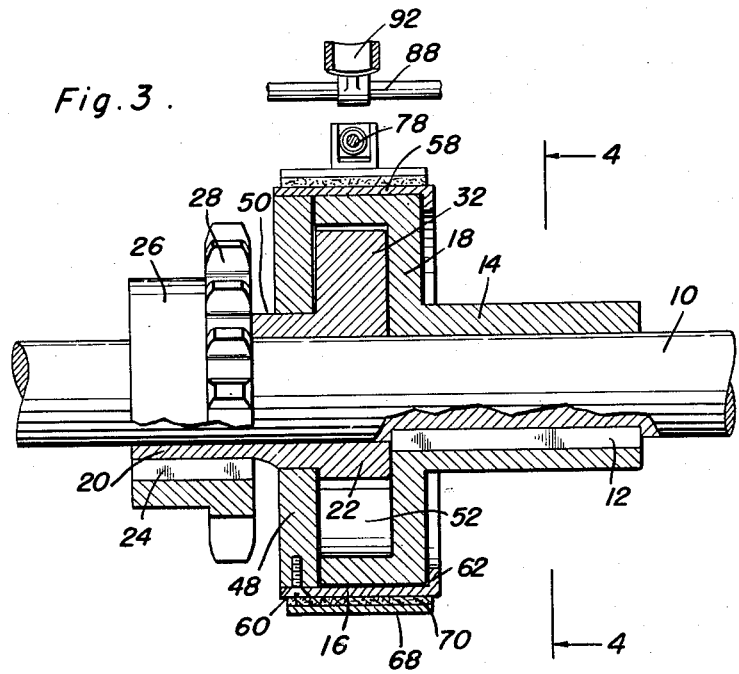
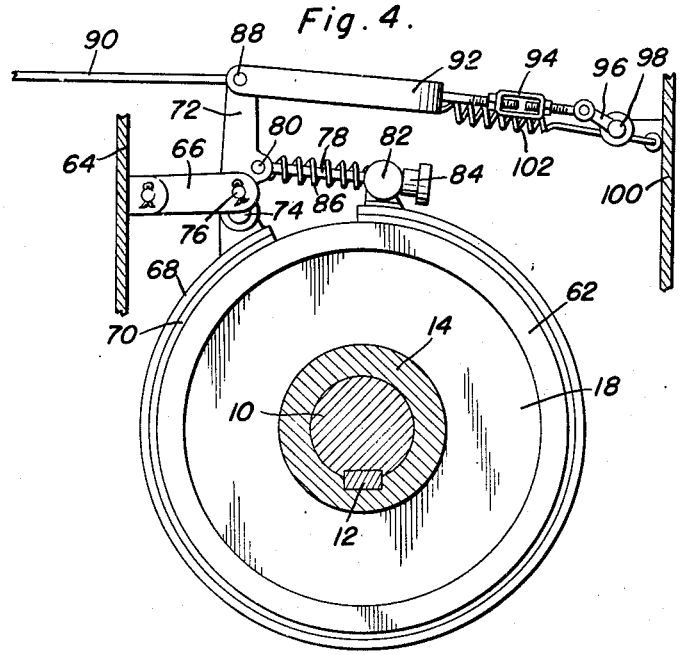
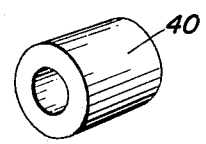
Ellis E. Davis
INVENTOR.

Patented July 18, 1950

2,515,295

UNITED STATES PATENT OFFICE 2,515,295

COMBINED CLUTCH AND BRAKE MECHANISM

Ellis E. Davis, Muncy, Pa.

Application February 10, 1948, Serial No. 7,345

1 Claim. (Cl. 192—17)

This invention comprises novel and useful improvements in a combined clutch and brake mechanism and more specifically pertains to a power control means for coupling co-axial driving and driven members and for simultaneously applying a brake and disengaging the clutch driving engagement between said members.

It is a primary object of the present invention to provide a single means for controlling the application of power to a clutch for simultaneously disengaging the clutch and applying a brake to the driven member.

An important feature of the invention resides in the provision of co-axial driving and driven sections, together with operable clutch elements therebetween, for establishing a one-way transmission of power between said sections, together with the means for simultaneously disengaging the clutch driving relation and simultaneously applying a brake to the driven element.

A further important feature of the invention resides in the provision of a mechanism as set forth in the preceding paragraphs, wherein there is provided a clutch finger plate having fingers for positively disengaging the clutch elements from their driving engagement with the driving and driven members.

A further feature of the invention resides in the provision of a device as set forth in the foregoing objects and features, wherein the finger plate and a brake drum are secured together to provide an enclosing housing for the driving and driven members.

And a final important feature of the invention to be specifically enumerated herein, resides in the provision of a compact mechanism having resilient means for normally establishing a driving engagement between driving and driven members, together with a clutch control plate for disengaging the driving relation and simultaneously applying a braking action directly to the driven element.

These, together with various ancillary objects and features of the invention which will later become apparent as the following description proceeds, are attained by this device, a preferred embodiment of which has been illustrated, by way of example of the principles of the invention only, in the accompanying drawings, wherein:

Figure 1 is a vertical sectional view through a preferred embodiment to illustrate the principles of the invention;

Figure 2 is a view similar to Figure 1 but illustrating the parts in a different position of operation;

Figure 3 is a vertical longitudinal sectional view through the device taken substantially on the plane of the section line 3—3 of Figure 2;

Figure 4 is a vertical sectional view taken substantially on the plane of the section line 4—4 of Figure 3;

Figure 5 is a perspective view of the clutch finger plate of the device; and,

Figure 6 is a perspective view of one of the clutch elements of the invention.

Referring now more specifically to the accompanying drawing, wherein like numerals designate similar parts throughout the various views, there is disclosed in Figure 3 a driving or power shaft 10 which may be associated with and constitutes a part of any desired apparatus or machine, and upon which is keyed as at 12 the hub portion 14 of an annular clutch drum 16 having a radial wall or closed end 18. Rotatably journalled upon the power shaft 10 as by a hub portion 20 is a radially extending disk-like clutch element 22 constituting a driven member. It will thus be seen that the clutch drum 16 and the plate-like clutch element 22 constitute driving and driven sections or members respectively, the hub 20 of the driven member having keyed thereto as at 24 any suitable power take-off member such as the sleeve 26 having gear teeth 28.

As will be seen by reference to Figures 1 and 2, the inner circumference of the clutch member 16 comprises an annular clutch surface 30 within which is rotatable the clutch element 22 as set forth hereinafter. The latter includes a plurality of substantially radial arms 32 whose outer ends are arcuately shaped and terminate in close relation to but provided with a working clearance with the clutch surface 30. Any suitable number of arms 32 may be provided, a device having three such arms being chosen for purposes of illustrating the principles of the invention. As illustrated in the drawings, the arms 32 are provided with forward and rearward surfaces, indicated at 34 and 36 respectively, which may be inclined at any desired angle to the radius of the arm. The direction of rotation of the device is indicated by the arrow 38.

It will thus be seen that the space between adjacent forward and rearward surfaces 34 and 36 and the clutch surface 30 constitute pockets within which are freely disposed cylindrical, tubular or solid clutch elements 40, one of which is shown in Figure 6. These elements, are so proportioned, and the angle of the surface 36 is so chosen with respect to the clutch surface 30 that when the driving element rotates in the direction indicated by the arrow 38, a wedging action is established between the surface 30, the element 40, and the surface 36, thereby locking these parts together and causing rotation of the driven element 22 in the same direction and at the same speed.

In order to insure that the clutch elements normally remain in their engaged position, the forward surfaces 34 of the arms 32 are provided with bores 42 within which are slidably received plungers 44 urged outwardly as by springs 46 to bias the elements 40 into locking engagement.

As will be readily understood, the clutching action is a one-way action, whereby when the driving element is rotated at a greater speed than the driven element, that is, in the direction of the arrow 38, a clutch engaging action is established; but when for any reason, the driven element rotates faster than the driving element, the clutch is released and a free wheeling action results.

A means is positively provided for disengaging the clutch elements. This means consists of a finger plate 48, see Figures 3 and 5, which comprises an annular disk of the same diameter as the driving clutch element drum 16, and which is freely and rotatably journalled on a suitable bearing surface 50 formed upon the hub 20 of the driven element. Extending laterally from the inner surface of the finger plate 48, are a plurality, in this instance three, wedge-shaped projecting fingers 52 which are preferably of the same width as the arms 32, whereby the fingers may be conveniently received within the above mentioned pockets, one finger being provided in each pocket adjacent the forward edge thereof. The nose 54 of the wedge-shaped fingers 52 are disposed at the extreme forward edge of the pockets, while the crescent-shaped rear surfaces of the fingers are disposed slightly in advance, rotationally, of the clutch elements 40. The spacing is such that when the clutch elements are in their locked or driving position, the concaved surfaces 56 of the fingers are spaced slightly from the forward convex surfaces of the clutch elements 40, permitting the clutch elements to remain in their locked position.

An annular brake drum 58 overlies the periphery of the clutch drum 16, with a very slight working clearance therebetween, and the finger plate 48, the brake drum being rigidly but removably secured thereto as by fastening screws 60. The other edge of the brake drum 58 is provided with a radially inwardly extending flange 62 which embraces the outer edge of the plate portion 18 of the clutch member 16, to thereby partially encase and retain the driving and driven elements 16 and 22 in their assembled position.

Mounted upon any suitable part of the apparatus with which the power control of the present invention is to be associated, such as a support 64, as by a pivoting link 66, is an annular brake shoe 68 having a brake lining 70 on its inner surface for expansion and contraction by a means to be now described for gripping and releasing the outer circumference of the brake drum 58.

The means for operating the brake mechanism and simultaneously operating the clutch as will appear hereinafter, includes a lever 72 pivoted to a suitable gear upon one end of the brake shoe 68 at at 74, and pivoted to the extremity of the supporting link 66 as at 76. A rod 78 is pivoted as at 80 to the lever 72 intermediate its ends, and extends through a swivel connection 82 carried by the other end of the brake shoe 68, the extending end of the rod 78 being screw-threaded to receive an adjusting nut 84. A compression spring 86 embraces the rod 78 and urges the ends of the brake shoe in opposite directions to release the brakes in a manner which is well understood in the art. Obviously, by adjusting the nut 84, the tightness of the brake shoes upon the brake drums can be regulated.

The outer end of the lever 72 is pivotally connected as at 88, with a brake and clutch actuating rod 90, whereby the brake and clutch may be simultaneously controlled by the operator of the apparatus to which this mechanism is attached, at any convenient point.

Likewise connected to the pivot 88 is a clevis 92 which is connected as by an adjustable turnbuckle 94 with a link 96 pivoted as at 98 to any suitable support surface upon the apparatus with which the present invention is to be associated, this support surface being indicated at 100. A contraction spring 102 is connected to the support surface 100 at one extremity, and to the pivot point 88 at the other extremity, to yieldingly bias the lever 72 in a clockwise direction about its supporting surface 76, to thereby yieldingly urge the brake shoe into its normal rest position.

As will be evident, when the rod 90 is drawn to the left as viewed in Figures 1, 2 and 4, the lever 72 is rotated counterclockwise against the action of the spring 102, about its pivot 76, thereby urging the pivot pin 74 and the adjacent end of the brake shoe towards the right, while the pivot pin and the other end of the brake shoe move toward the left, thereby contracting or clamping the brake lining upon the brake drum 58.

As soon as the brake shoe is clamped upon the drum 58, the latter, which is rigidly attached to the finger plate 48, retards the rotation of the latter thus causing the relative movement of the brake drum, finger plate, and fingers in a direction opposite to the direction of rotation of the driving element as indicated by the arrow 38. This relatively rearward motion of the finger plate thus causes the concaved surfaces 56 of the fingers to engage the leading portions of the clutch elements 40 and force the same rearwardly with respect to their direction of rotation, against the pressure of the plungers 44 and springs 46, thereby forcing the elements rearwardly of their pockets and breaking the driving engagement between the clutch surface 30 and the driven surface 36. At this point, the clutch is disengaged and the driving and driven elements are free to rotate independently of each other. However, since the brake shoe pressure upon the brake drum continues, the fingers force the elements 40 against the rear surface 34 of the driven element into the position shown in Figure 2, whereupon the force of the brake shoes, is directly applied through the brake drum, fingers and finger plate, to the elements 40 and thence to the driven element 22, to thereby positively apply a braking action thereto. Thus, although the driving element is still free to rotate, the clutch is released and a positive braking action is applied to the driven element by one operation of the rod 90.

From the foregoing, it is thought that the operation of this mechanism will be readily understood and further explanation is believed to be unnecessary. It will readily be appreciated that the novel power control device set forth hereinbefore may be applied to various types of machinery, such as tractors, farm machinery, and in fact in any place where it is desired to control the application of power from a driving to a driven member.

As will be readily understood, the finger plate and brake drum assembly constitutes means for holding the driving and driven elements into their assembled relation, and for preventing the ingress of dirt, water or the like into their interior.

Since numerous modifications and changes falling within the principles of the invention as set forth in the accompanying description and drawings will readily occur to those skilled in the art, it is not intended to limit the invention to the exact embodiment shown and described, but all suitable modifications and equivalents may be resorted to falling within the scope of the appended claim.

Having described the invention, what is claimed as new is:

A combined clutch and brake power control comprising a rotatable power shaft, a clutch member having a hub journaled on said shaft, a power take-off keyed to said hub, an annular clutch finger plate rotatable on said hub, a clutch drum embracing said clutch member and keyed to said shaft, a brake drum secured to said finger plate and embracing said clutch drum, a contractile brake shoe embracing said brake drum, means for operating said shoe, clutch elements operatively received between said clutch member and said clutch drum for one-way clutch engagement therewith, and clutch fingers on said finger plate for engagement with said elements for releasing said clutch engagement upon contraction of said shoe on said drum, said clutch member having a plurality of radial arms defining chambers with said clutch drum, each of said clutch elements including a cylindrical member loosely received in each chamber, and each finger being wedge-shaped and having arcuate surfaces for engaging each of said cylindrical members.

ELLIS E. DAVIS.

REFERENCES CITED

The following references are of record in the file of this patent:

UNITED STATES PATENTS

| Number | Name | Date |
|---|---|---|
| 715,418 | Parsons | Dec. 9, 1902 |
| 879,016 | Starr | Feb. 11, 1908 |
| 2,001,048 | Ziegler | May 14, 1935 |
| 2,069,558 | Rauen et al. | Feb. 2, 1937 |
| 2,175,290 | Gustafson | Oct. 10, 1939 |